United States Patent [19]
Baum

[11] Patent Number: 6,124,444
[45] Date of Patent: *Sep. 26, 2000

[54] DNA SEQUENCES USEFUL FOR COMPUTATION

[75] Inventor: Eric Burton Baum, Princeton, N.J.

[73] Assignee: NEC Research Institute, Inc.

[*] Notice: This patent issued on a continued prosecution application filed under 37 CFR 1.53(d), and is subject to the twenty year patent term provisions of 35 U.S.C. 154(a)(2).

[21] Appl. No.: 08/552,763

[22] Filed: Nov. 3, 1995

[51] Int. Cl.$^7$ ................................................. C07H 21/04
[52] U.S. Cl. ........................ 536/23.1; 536/24.2; 536/24.3; 435/6; 702/19; 702/20
[58] Field of Search .................................. 536/23.1, 24.2, 536/24.3; 435/6; 702/19, 20

[56] References Cited

PUBLICATIONS

Rougeon et al, Gene 1: 229 (1977).
L.M. Adleman, "Molecular Computation of Solutions to Combinatorial Problems," Science, vol. 266, pp. 1021–1024 (1994).
R.J. Lipton, "DNA Solution of Hard Computational Problems," Science, vol. 268, pp. 542–545 (1995).
E.B. Baum, "Building an Associative Memory Vastly Larger than the Brain," Science, vol. 268, pp. 583–585 (1995).
D. Boneh et al, "On the Computational Power of DNA," preprint available at: http://www.CS.Princeton.EDU/~dabo/biocomp.html.
D. Boneh et al, "Breaking DES Using a Molecular Computer," preprint available at: http://www.CS.Princeton.EDU/~dabo/biocomp.html.
B. Alberts et al, "Molecular Biology of the Cell", (New York: Garland Publishing, 1994) pp. 319–320.
Baum, E.B., "Building an Associative Memory Vastly Larger than the Brain," Science, vol. 268, Apr. 28, 1995, 583–585.
Reif, J.H., "Parallel Molecular Computation," Annual ACM Symposium on Parallel Algorithms and Archi–Tectures, Santa Barbara, Jul. 17–19, 1995, no.Symp.6, Jan. 1, 1995, Association pp. 213–223.
Carter, F.L., "Molecular Electronic Devices," Marcel Dekker Inc, 1983, 213–222.

*Primary Examiner*—James Martinell
*Attorney, Agent, or Firm*—Philip J. Feig

[57] ABSTRACT

In DNA computing there are DNA sequences which will substantially eliminate binding errors for molecules used in the computing processing. The elimination of binding errors will prevent extraction errors and binding during computations. A set of DNA sequences $\{Z_j\}$ and spacer sequence $S_0$ must meet the criteria that there is no subsequence $\chi$ of length k, which occurs in any two sequences $\{Z_j\}$ or subsequence $\chi$ occurs in a sequence $S_0 Z_j S_0$ and the complement $\chi$ occurs in a sequence $S_0 Z_j S_0$, where $Z_j$ is at least of length k, so that it may be extracted.

10 Claims, 1 Drawing Sheet

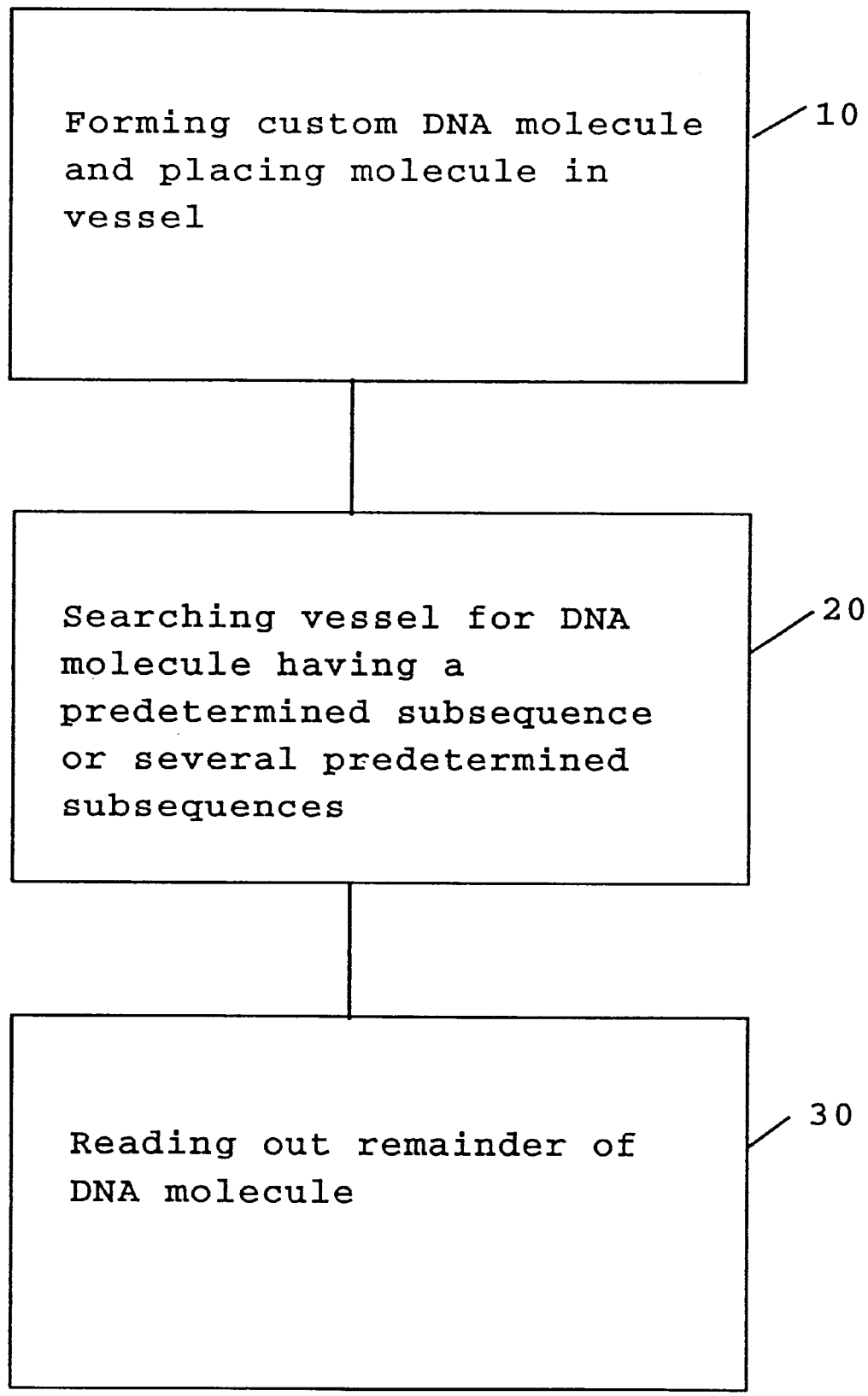

DNA SEQUENCES USEFUL FOR COMPUTATION

FIELD OF THE INVENTION

The present invention concerns DNA computing and particularly DNA subsequences which are most useful for DNA computation

BACKGROUND OF THE INVENTION

There is growing interest in the use of DNA and the methods of molecular biology to do computation. In an article entitled "Molecular Computation of Solutions to Combinatorial Problems" appearing in Science, vol. 266, pages 1021–1024 (1994), L. M. Adleman described an approach requiring the encoding of computer science problems into DNA sequences, and relying heavily on "extraction" of sequences containing a particular subsequence by use of complementary subsequence. Subsequently, R. J. Lipton in an article entitled "DNA Solution of Hard Computational Problems," in Science, vol. 268, pages 542–545 (1995) proposed an approach for using DNA to solve Satisfiability and other problems in the computational class NP. Lipton proposed a particular encoding of boolean vectors and relied on similar extraction operations using complementary sub-sequences. E. B. Baum, in an article entitled "Building an Associative Memory Vastly Larger than the Brain," in Science, vol. 268, pages 583–585 (1995), proposed to use a similar encoding, and some variants, for content addressable memories. D. Boneh et al in a paper entitled "On the Computational Power of DNA," a preprint of which is available at http://www.CS.Princeton.EDU/~dabo/biocomp.html and D. Boneh et al in a paper entitled "Breaking DES Using a Molecular Computer," a preprint of which is available at http://www.CS.Pririceton.EDU/~dabo/biocomp.html propose computer algorithms which rely on similar encodings and method. U.S. patent application Ser. No. 08/384,995 entitled "Associative Memory using DNA" by E. B. Baum describes DNA based content addressable memories, which application is hereby incorporated herein by reference. U.S. patent application Ser. No. 08/414,398 entitled "Molecular Automata Utilizing Single- or Double-Strand Oligonucleotides," by A. L. Schweitzer and W. D. Smith, now U.S. Pat. No. 5,804,373 describes the use of DNA as a Turing machine.

For each of these arrangements, a set of DNA subsequences must be chosen. Practical considerations will force these subsequences to satisfy certain requirements. Lipton and Adleman suggested using random subsequences. In fact, practical requirements may impose constraints that cannot be met by random sequences, and it is not a priori obvious that they can be satisfied at all.

When using the encoding described by Lipton in order to encode the Boolean vectors $\{0, 1\}^n$, where n is about 60, for each i=1, . . . , n, two subsequences of DNA $X_i$ and $Y_i$ are chosen, corresponding respectively to a 0 or a 1 in the ith component. A vector in $\{0, 1\}^n$ is then encoded by the concatenation of the appropriate subsequences, perhaps spaced by a fixed subsequence, or a subsequence corresponding to the number of the component. This evidently requires at least 120 suitable subsequences. In some of the algorithms proposed in the Boneh et al articles, the initial vectors are extended by appending additional subsequences in a similar fashion (e.g. corresponding to a tag that the vector encoded satisfies some Boolean circuit) so that the number of subsequences needed will grow substantially, and may reach tens of thousands or more. If enough suitable subsequences are not available, this will constrain algorithmic possibilities.

Let Z be a sequence of DNA. Then let $\overline{Z}$ denote the sequence of DNA which is Watson-Crick complementary to Z. The Watson Crick complement of the sequence Z is the sequence obtained by replacing A and T and C and G and vice versa, and then taking the sequence in the reverse order. For example, if Z=AGTCC, then $\overline{Z}$=GGACT.

Using an encoding as described above, a key operation in many of the algorithms proposed is an "extract". In an extract operation, a subsequence $\overline{X}_i$ or $\overline{Y}_i$ is produced to which a magnetic bead is affixed. Placing these magnetic beads into a test-tube computer, the introduced subsequences bind to any molecules already present containing the complementary subsequences. These bound molecules can now be extracted magnetically. This process allows one to search the test tube for vectors having particular component values. In practice, some molecules may incorrectly bind or fail to bind at the proper location

SUMMARY OF THE INVENTION

The present invention overcomes the limitations of the prior art by applying specific constraints and defining sets of DNA subsequences which meet the practical requirements related to DNA computing. The result is improved use of DNA for computation.

Constraints are imposed on the choice of molecules in order to avoid two difficulties. First, when extracting $X_i$, $\overline{X}_i$ should stick only to molecules containing $X_i$. If $\overline{X}_i$ includes a sufficiently long subsequence in common with $X_j$, and also with other molecules not containing $X_i$, there may be erroneous extracts. In order to avoid this, a first constraint is imposed that there be no long subsequence common to $X_i$ or either one of the other $X_j$ or $\overline{Y}_j$, or to the overlap region between some of $X_i$ or $Y_i$ and whatever sequence may follow it on a molecule. Second, a molecule should not stick to itself, or to one of the other molecules in the solution. If this happened, the computer would slow down or become unreliable. Thus, a second constraint is that there is no long subsequence such that both it and its complement may appear in the solution.

It is assumed that a subsequence of length k is sufficiently long to present a possibility of sticking, and thus it is desired not to have accidental collisions of length k. The permissible magnitude of k in practice is not certain. It is possible that conditions may require k to be as low as 5. A DNA based computer will work more accurately and more rapidly with a lower value of k.

BRIEF DESCRIPTION OF THE DRAWING

The sole FIGURE is a flow diagram of a preferred process for implementing the present invention.

DETAILED DESCRIPTION OF THE INVENTION

Referring to the figure, the basic process of DNA associative memories is to form a custom DNA molecule and place the molecule in a vessel 10. Then, search the vessel contents for DNA molecules having a predetermined sequence or several predetermined sequences 20. Read out the remainder of the DNA molecule having the predetermined sequence 30. The predetermined sequence is the memory address. The remainder of the molecule is the data.

The forming of subsequences corresponding to a predetermined sequence may be accomplished in several ways.

For example, it is possible to form the sequences by encoding the number of the component in the sequence followed by a distinctive "stop" sequence. The "stop" sequence is selected to be broken by a particular restriction enzyme, which facilitates chopping a DNA molecule into its component subsequences.

Instead of simply using a code for the location number, it is possible to use sequences selected to be unambiguously distinguishable using restriction mapping, which may facilitate reading of the information. Restriction mapping is described in the book by B. Albert et al entitled "Molecular Biology of the Cell" published by Garland Publishing, New York, pages 319–320, 1994.

A preferred method of searching the vessel, given a "cue" comprising a subset of the non-zero components of a word is to extract all the DNA molecules containing the appropriate cue sequences.

An alternative search method is to use complementary sequences containing markers to search for subsequences. For each component specified in the cue, the complement of the corresponding subsequence of DNA, attached to a magnetic bead, is introduced into the vessels. These molecules will bond to the DNA molecules in the memory having the predetermined cue subsequences. These banded molecules are then separated by diffusion. Such a procedure is described in the article by Adleman, supra.

Restriction mapping is used to read the remainder of the molecule.

Having described an associative memory using DNA, the selection of predetermined sub-sequences, forming the present invention, will now be described in detail.

It is known in the prior art that by using sufficiently long random sequences of bases as component subsequences $X_i$, the base itself would not appear. However, if complementary subsequences of a finite length k may stick to the base, the absence of the entire sequence is not beneficial.

Thus, it is necessary to determine a spacer sequence $S_0$ and a set of sequences $\{Z_j\}$ as large as possible with the property that there is no subsequence $\chi$ of length k, which (a) occurs in any two sequences $S_0 Z_j S_0$ or (b) where $\chi$ occurs in a sequence $S_0 Z_j S_0$ and the complement $\bar{\chi}$ occurs in a sequence $S_0 Z_j S_0$. It is also necessary that the sequences $Z_j$ are themselves at least of length k, so that they can be used for extraction.

It is also possible that it is desired to determine a set of spacer sequences $S_0$ which will not be used for extraction, and a set of sequences $Z_j$ which will be used for extraction. The following description can be applied to such generalizations.

It will be assumed that the sequences $Z_j$ are all of length k, If the sequences $Z_j$ are longer, this merely induces more constraints. Using longer sequences will achieve a smaller set of sequences, but may have practical advantages in the extract operation.

Next, the set of sequences of length k are divided into equivalence classes by the operation Complement. There are $4^k$ strings of length k based upon the set of A, C, G and T DNA components. If k=2m+1 (for m an integer) then no sequence is equal to its complement, so there are $4^k/2$ equivalence classes each of size 2. If k=2m, then there are $4^m$ sequences equal their complements (since each of the first m components can be chosen in any of 4 ways, thus determining a sequence if required equal to its complement). So for even values of k there are $(4^k-4^m)/2$ equivalence classes of size 2 and $4^m$ of size 1.

It should be noted that if sequences are restricted to neither beginning nor ending with A or T, then if k=2m+1, there are $4^{k-1}/2$ equivalence classes each of size 2, and if k=2m there are $2\times 4^{m-1}$ classes of size 1 and $2\times 4^{k-2}-4^{m-1}$ classes of size 2.

If a spacer sequence k X's is selected. Then it is apparent that it is possible to form a large set satisfying the above constraints by choosing one element from each equivalence class except those which either begin or end with X or $\bar{X}$.

However, it is possible to build a larger set. For concreteness, let the spacer be k A's. Therefore, the above rule would not have allowed sequences beginning or ending with T's or A's. Assume also that k=2m+1 so there are no equivalence classes of size 1. For each string S of length k-1, not beginning or ending with A or T, from an equivalence class of size 2, consider its complement $\bar{S}$. ST and TS can be selected but $\overline{ST}$ or $\overline{TS}$ cannot be selected. Having accumulated each pair ST and TS from every equivalence class in the set of length k strings, any strings that either begin with or end with S must be removed. It is expected that this will not remove from consideration both elements of any equivalence classes. For both elements of an equivalence class to be removed, both a string SX and the string $\overline{XS}$ must be removed. This would happen when two strings $S_1 T$ and $TS_2$ are added such that $\overline{SX} \equiv \overline{XS}_1 = \overline{YS}_2$. But this implies $\bar{S}_1 = S_2$, which is not permitted.

For those k-1 strings which are self complementary, it is permitted to add both ST and TS, and any representative of the class XS, for X={C, G}. Thus, ST and TS are excluded from this form.

Hence, for each size 2 equivalence class of k-1 length strings not beginning with or ending with A or T, it is possible to choose a representative S, and add both TS and ST. It is also possible to additionally add a representative from every length k class which does not end or begin with A or T, selecting a member still allowed after the necessary eliminations. Following the count of the number of equivalence classes from above, this simple algorithm allows the selection of a set of size $2\times(2\times 4^{k-3}-4^{m-1})+2\times 4^{k-2}=3\times 4^{k-2}-2\times 4^{m-2}$.

In considering building a larger set, if ST is added, then neither $\overline{SA}$ nor $\overline{AS}$ can be added. If SA is added, then XS and $\overline{SX}$ could not be added. Likewise, AS cannot be added. So there is no possible gain in terms of adding strings beginning or ending with A.

However, it is possible to create a larger set, as described below, by using length k-1 sequences which are permitted to end in A.

The symbol $R_i^j$ denotes a string of length i whose first element is neither A nor T. The superscript here serves solely to denote different such strings and will be omitted where no confusion is possible. Let $Y^j$ denote a single base either C or G. Again, the superscript is only to distinguish different elements, So Y is simply an alternative name for R.

If $S=R_{k-2}A$, then $\bar{S}$ begins with T. It is known that if ST is added, $\overline{ST}$ cannot be added. Thus, it is possible to consider adding strings ending in AT, or ending and beginning in T, but not both. Consider the set of strings of form $R_{k-2}AT$. First, note that it is possible to safely add all strings of form $R_{k-3}AAT$ or $R_{k-3}TAT$, precisely because strings which both end and begin with T have been excluded. That is, if $R_{k-3}AA$ is referred to as string S, adding ST would conflict with $\overline{ST}$, but this string is not added since it both begins and ends with T, so there is no conflict.

Next, add strings of form $R_{k-3}YAT$, for $Y \in \{C, G\}$. These strings will be denoted as $Q^i AT$, where the i indexes different strings, the Q are of length k-2, and they neither begin nor end with A nor T. When a string of form QAT is added, a string of form $\overline{TQ}X$ cannot be added. Thus, instead $\overline{TX}Q$ will be included. This string is permitted unless $$\overline{X}Q^i = \overline{A}^jY \qquad (1)$$

for any Y, where both $Q^i$ and $Q^j$ have been included. To insure this does not happen, each time a string $Q^i$AT is added to the set, conflicting Q's must be removed. That is, each time a Q is added, two others must be constructed by CQ=$\overline{Q}$'Y, and GQ=$\overline{Q}$"Y and Q' and Q" are removed from consideration. However, each time Q=$R_{k-3}$C is added, it is permissible to add also $R_{k-3}$G, without any elimination. Therefore, for each two Q's added, two other strings must be eliminated. Equation 1 does not eliminate any potential Q which has an A or a T in its second to last position because $Q^i$ in the equation never begins with A or T. By definition, any $Q^j$ satisfying equation 1 on the right hand side will not have an A or a T in its second to last position.

In summary, the above procedure yields the following strings: all strings of form $R_{k-3}$AAT and $R_{k-3}$TAT. All strings of form $R_{k-4}$ACAT, $R_{k-4}$TCAT, $R_{k-4}$AGAT, $R_{k-4}$TGAT. Half of the strings of form $R_{k-4}$CCAT, $R_{k-4}$GCAT, $R_{k-4}$CGAT, $R_{k-4}$GGAT. Half of the strings of form ST for S≠$\overline{S}$ and S=$R_{k-2}$C or $R_{k-2}$G, and for each of these the corresponding strings TS. A representative of each class neither ending nor beginning with A nor T. Assuming k=2m+1≧5, this works out to be $3 \times 4^{k-2} + 5 \times 4^{k-4} - 2 \times 4^{m-1}$.

In addition, further DNA strings useful for computation selected from the group of strings of the form $R_{k-3}$ AAT, $R_{k-4}$ ACAT, $R_{k-4}$ TCAT, $R_{k-4}$ AGAT and $R_{k-4}$ TGAT are obtainable by replacing DNA base A with DNA base C or DNA base G and by replacing DNA base T by either DNA base C or DNA base G, whichever of DNA base C or DNA base G that did not replace DNA base A and by replacing DNA base C with DNA base A or DNA base T and by replacing DNA base G by either DNA base A or DNA base T, whichever of DNA base A or DNA base T that did not replace DNA base C.

The largest set is described above. There are representatives of each size 2 class not beginning or ending with A or T. As discussed, adding classes beginning or ending with A will exclude more additional strings than are already in the set. There is a representative of all possible classes of the form ST or TS where S neither begins nor ends with T will result in a selection that is smaller than the construction given. Therefore, the only additional freedom is to consider strings of the form ST where S ends in T or A. Using strings ending in T will cost more than it gains. Analysis of the set of strings ending in AT was performed in order to arrive at this maximal set. Thus, if any string presently omitted is included, at least an equal number of strings presently included would have to be eliminated.

A different sequence as spacer will not expand the set. By using k A's, all translations into the spacer with only a requirement that neither the first nor the last letter of any sequence be A has been eliminated. If a more complex spacer sequence is used, the result is additional constraints.

In conclusion, the maximum size set of strings having a spacer sequence $S_0$ and a set of sequences $\{Z_j\}$ as large as possible, with the property that there is no subsequence $\chi$ of length k which occurs in any two sequences $S_0Z_jS_0$ or where $\chi$ occurs in some $S_0Z_jS_0$ and its complement $\overline{\chi}$ occurs in some $S_0Z_jS_0$, for k=rm+1 or k=2rm k≧5, is $3 \times 4^{k-2} + 5 \times 4^{k-4} - 2 \times 4^{m-1}$.

The constraints are quite restrictive for small k. The number of sequences possible when limited by the above constraints is given below for various values of k.

| k = 4 | 5 | 6 | 7 | 8 | 9 |
|---|---|---|---|---|---|
| N(k) = 50 | 208 | 816 | 3232 | 13440 | 54144 |

Clearly, k must be at least five for use in many interesting applications. A value of k as low as five may however be consistent with many DNA computing applications, potentially speeding up and avoiding errors in retrieval. If it is practically possible to work with large k, e.g. as large as 9, it might be better to reduce the number of distinct sequences achievable in order to work with longer sequences. If using length L sequences, for L>k, then in an extract step there would have to be a stronger fit between the retrieval sequence and its mate. The number of such sequences achievable is certainly no larger than N(k)/(L−k).

While there has been described preferred DNA sequences for use with DNA memories and computers which prevent extraction errors and prevent a DNA computer from in-advertently binding, it will be apparent to those skilled in the art that variations and modifications are possible without deviating from the broad principle and spirit of the present invention which shall be limited solely by the scope of the claims appended hereto.

What is claimed is:

1. A set of DNA molecules comprising DNA strings useful for computation selected from the group consisting of strings of the form $R_{k-3}$AAT, $R_{k-3}$TAT, $R_{k-4}$ACAT, $R_{k-4}$TCAT, $R_{k-4}$AGAT and $R_{k-4}$TGAT, where A, T, C, and G are DNA bases and $R_{k-3}$ is any string of length k-3 whose first element is neither A nor T, $R_{k-4}$ is any string of length k-4 whose first element is neither A nor T, and where strings are separated by spacer sequences of k DNA base A.

2. A set of DNA molecules comprising DNA strings useful for computation comprising: strings of length k where neither the first nor last base of any string is an A base or a T base and no string of DNA and its complement are both included in the sequence, and further including spacer sequences of k DNA base A or k DNA base T separating said strings, where A and T are DNA bases.

3. A set of DNA molecules comprising DNA strings useful for computation as set forth in claim 2, where k is 5.

4. A set of DNA molecules comprising DNA strings useful for computation comprising: strings of length k where neither the first nor the last base of any string is a C base or a G base and no string of DNA and its complement are both included in the sequence, and further including spacer sequences of k DNA base C or k DNA base G separating said strings, where C and G are DNA bases.

5. A set of DNA molecules comprising DNA strings useful for computation as set forth in claim 4, where k is 5.

6. A set of DNA molecules comprising DNA strings useful for computation selected from the group consisting of strings of the form $R_{k-3}$TTA, $R_{k-3}$ATA, $R_{k-4}$TCTA, $R_{k-4}$ACTA, $R_{k-4}$TGTA and $R_{k-4}$AGTA, where A, T, C, G are DNA bases and $R_{k-3}$ is any string of length k-3 whose first element is neither A nor T, $R_{k-4}$ is any string of length k-4 whose first element is neither A nor T, and where strings are separated by spacer sequences of k DNA base T.

7. A set of DNA molecules comprising DNA strings useful for computation selected from the group consisting of strings of the form $R_{k-3}$AAT, $R_{k-3}$TAT, $R_{k-4}$AGAT, $R_{k-4}$TGAT, $R_{k-4}$ACAT and $R_{k-4}$TCAT where A, T, C and G are DNA bases and $R_{k-3}$ is any string of length k-3 whose first element is neither A nor T, $R_{k-4}$ is any string of length k-4 whose first element is neither A nor T, and where strings are separated by spacer sequences of k DNA base A.

8. A set of DNA molecules comprising DNA strings useful for computation selected from the group consisting of strings of the form $R_{k-3}$TTA, $R_{k-3}$ATA, $R_{k-4}$TGTA, $R_{k-4}$AGTA, $R_{k-4}$TCTA and $R_{k-4}$ACTA, where A, T, C, G are DNA bases and $R_{k-3}$ is any string of length k-3 whose first element is neither A nor T, $R_{k-4}$ is any string of length k-4 whose first element is neither A nor T, and where strings are separated by spacer sequences of k DNA base T.

9. A set of DNA molecules comprising DNA strings useful for computation selected from the group consisting of strings of the form $R_{k-3}$CCG, $R_{k-3}$GCG, $R_{k-4}$CTCG, $R_{k-4}$GTCG, $R_{k-4}$CACG and $R_{k-4}$GACG where A, T, C and G are DNA bases and $R_{k-3}$ is any string of length k-3 whose first element is neither C nor G, $R_{k-4}$ is any string of length k-4 whose first element is neither C nor G, and where strings are separated by spacer sequences of k DNA base C.

10. A set of DNA molecules comprising DNA strings useful for computation selected from the group consisting of strings of the form $R_{k-3}$GGC, $R_{k-3}$CGC, $R_{k-4}$GTGC, $R_{k-4}$CTGC, $R_{k-4}$GAGC and $R_{k-4}$CAGC where A, T, C and G are DNA bases and $R_{k-3}$ is any string of length k-3 whose first element is neither C nor G, $R_{k-}$4 is any string of length k-4 whose first element is neither C nor G, and where strings are separated by spacer sequences of k DNA base G.

\* \* \* \* \*